US011810599B2

(12) United States Patent
Cain

(10) Patent No.: US 11,810,599 B2
(45) Date of Patent: Nov. 7, 2023

(54) SYSTEM AND METHOD OF DYNAMIC RANDOM ACCESS RENDERING

(71) Applicant: Grass Valley Limited, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 17/225,987

(22) Filed: Apr. 8, 2021

(65) Prior Publication Data

US 2021/0327471 A1  Oct. 21, 2021

Related U.S. Application Data

(60) Provisional application No. 63/010,164, filed on Apr. 15, 2020.

(51) Int. Cl.
*G11B 27/036* (2006.01)

(52) U.S. Cl.
CPC .................. *G11B 27/036* (2013.01)

(58) Field of Classification Search
CPC .................................................. G11B 27/036
See application file for complete search history.

(56) References Cited

U.S. PATENT DOCUMENTS

| 9,830,304 B1* | 11/2017 | Simeonov | G06F 40/103 |
| 2009/0037433 A1* | 2/2009 | Nakamura | G06F 16/9566 |
| 2018/0131743 A1* | 5/2018 | Gorin | H04L 65/70 |
| 2019/0261041 A1* | 8/2019 | Swenson | G11B 27/031 |
| 2019/0265986 A1 | 8/2019 | Mathur et al. | |

OTHER PUBLICATIONS

Raji Mohammad et al., "Scientific Visualization as a Microservice", IEEE Transactions on Visualization and Computer Graphics, Nov. 5, 2018, 1760-1774, vol. 26, No. 4, IEEE Service Center, Los Alamitos, CA, US.

* cited by examiner

*Primary Examiner* — Thai Q Tran
*Assistant Examiner* — Jose M Mesa
(74) *Attorney, Agent, or Firm* — ARENTFOX SCHIFF LLP

(57) ABSTRACT

A system is provided for dynamic random access rendering of media content. The system includes a rendering tool that loads a recipe having a reference to input essence and an instruction that collectively generates an output essence using the at least one input essence. The system further includes a render engine that execute the instruction and includes a file format parser configured to load the input essence from a file of media content. The render engine also includes plugin having a web server embedded therein that is communicatively coupled with a TCP port for receiving a request from a client device for the output essence. The render engine generates the output essence from the input essence in accordance with the instruction in the recipe and transmits the generated output essence to the client device for display thereon.

19 Claims, 4 Drawing Sheets

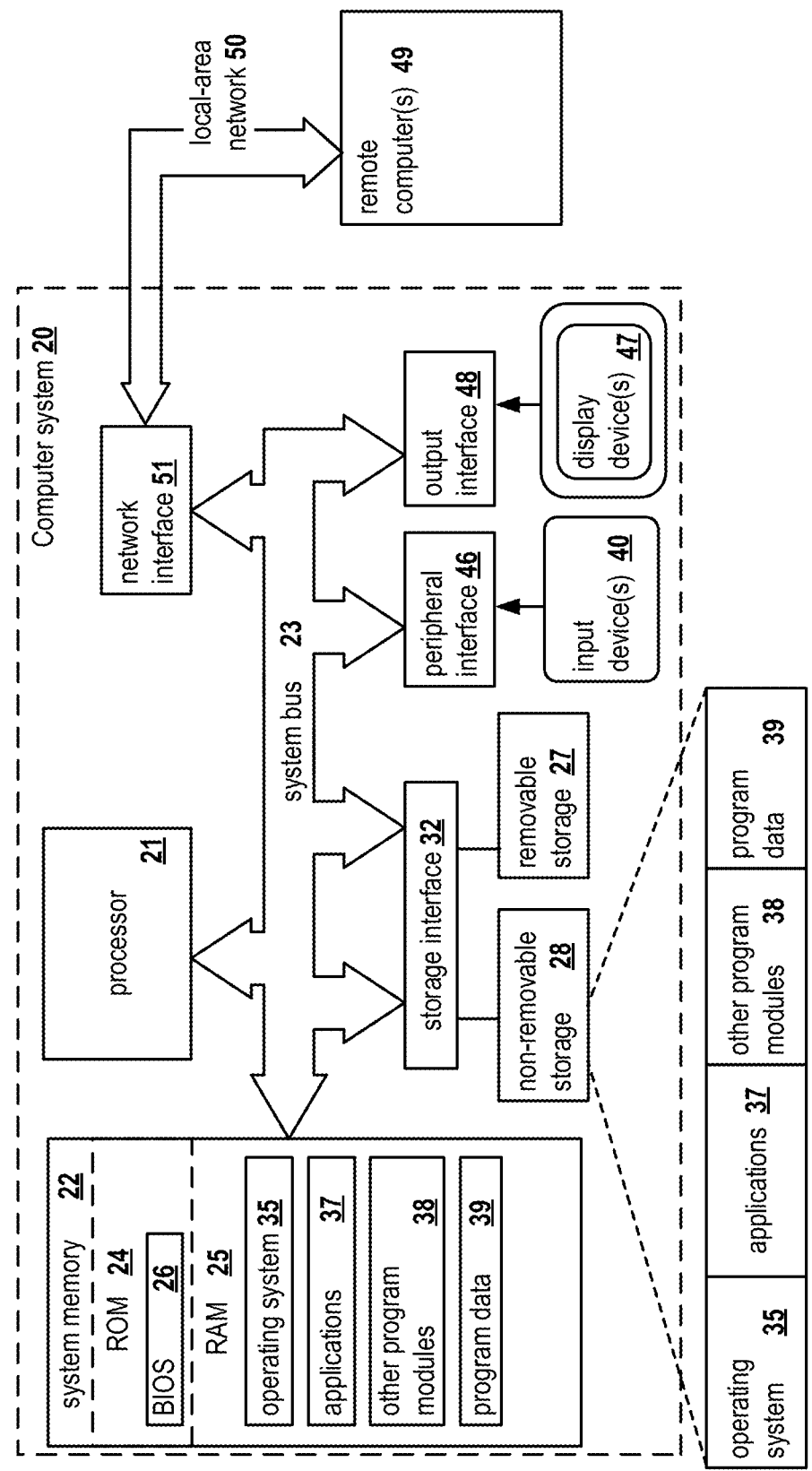

SYSTEM AND METHOD OF DYNAMIC RANDOM ACCESS RENDERING

CROSS REFERENCE TO RELATED APPLICATIONS

The current application claims priority to U.S. Patent Provisional Application No. 63/010,164, filed Apr. 15, 2020, the entire contents of which are hereby incorporated by reference in its entirety.

TECHNICAL FIELD

The present disclosure generally relates to the rendering of media content, and, more particularly, to a system and method of dynamic random access rendering of media content.

BACKGROUND

The term "recipe" in the present disclosure denotes a file that includes creative decisions and instructions for rendering a new essence from one or more source essences. An essence denotes media that can be consumed by a user (e.g., a video clip, an audio clip, and/or ancillary data such as captions). Recipes reference essences and then add processing instructions to deliver an output. Such references are normally embodied as paths to concrete files. Thus, the requirement for the essence is indirect via file format parsers built into the tools that can render the recipes. A conventional approach to obtain the output of a recipe, as a useful artefact, is to open the recipe in a tool (e.g., Adobe Premiere Pro™) that is compatible with the recipe (e.g., .prproj extension), and then instruct the tool to create a linear essence file containing the output of the render in a format that can be widely read.

However, this conventional approach is costly in terms of time and is inefficient, especially when multiple entities are collaborating using various tools to ultimately render a single essence. Consider a scenario in which an editor has created a ½ hour magazine program. A broadcaster may want to offer this magazine program on their website, but may additionally want to burn the station logo into every frame of the magazine program so that the broadcaster gets brand recognition for the work and others cannot easily reuse the content.

This results in two recipes. The first recipe involves rendering the magazine program. The second recipe involves rendering the magazine program with the brand logo. The second recipe necessarily relies upon the output of the first recipe having being rendered. The conventional render pipeline requires the first tool to fully render the recipe to an essence file, such that the essence file is fully complete and stable on disk before the second render tool can be invoked to add the brand logo. Moreover, the second tool has to complete its task before the resulting essence file is ready to be posted to the broadcaster's website.

Even if the brand logo is to be burned on a small set of frames, the conventional approach would still require at least two recipes positioned in a linear pipeline. As a result, time is not conserved. This conventional approach can thus be identified as the "just-in-case" approach in which everything that is potentially needed is rendered as a complete essence file to a disk location.

SUMMARY

According to an exemplary aspect, a system and method is provided for dynamic (or "just-in-time") random access rendering. Specifically, the system and method disclosed herein exploit the application programming interfaces (APIs) of a rendering tool to allow a web server to be embedded in that tool, enabling other devices to access the results of applying a recipe to one or more essence sources on a frame by frame basis.

In an exemplary aspect, the system for dynamic random access rendering comprises a rendering tool configured to load a recipe comprising a reference to at least one input essence and at least one instruction that collectively generates an output essence using the at least one input essence. The system comprises a render engine of the rendering tool configured to execute the at least one instruction to generate the output essence. The system further comprises an HTTP client of the render engine configured to request, via an embedded web server hosted by a plugin of another rendering tool, a plurality of frames of the at least one input essence from the other rendering tool and, in response, receive, via the embedded web server, a payload comprising the plurality of frames. The HTTP client provides the plurality of frames to the render engine to generate the output essence from the plurality of frames in accordance with the at least one instruction in the recipe.

In another exemplary aspect, a system is provided or dynamic random access rendering of media content, with the system including a rendering tool configured to load a recipe comprising a reference to at least one input essence and at least one instruction that collectively generates an output essence using the at least one input essence; and a render engine of the rendering tool configured to execute the at least one instruction and including a file format parser configured to load the at least one input essence from a file of media content, and a plugin having a web server embedded therein that is communicatively coupled with a TCP port. Moreover, the system includes a client device configured to request media content configured by the recipe and to receive the output essence and display the received output essence on a browser executed thereon. In this aspect, the render engine is configured to generate the output essence from the at least one input essence in accordance with the at least one instruction in the recipe.

In another exemplary aspect, a system is provided for dynamic access rendering of media content. In this aspect, the system includes a client device configured to request media content that is configured by a recipe and to display output essence on a browser executed on the client device; a first rendering tool configured to load the recipe in response to a request from a client device, with the recipe comprising a reference to at least one input essence and at least one instruction for processing the at least one input essence to generate the output essence; and a render engine of the first rendering tool configured to execute the at least one instruction. Moreover, the system includes an HTTP client of the first render engine configured to request, from an embedded web server hosted by a plugin of a second rendering tool, a plurality of frames of the at least one input essence; receive, from the embedded web server, a payload comprising the plurality of frames of the at least one input essence; and provide the plurality of frames to the render engine of the first rendering tool to generate the output essence from the plurality of frames by executing the at least one instruction in the recipe to process the plurality of frames.

In a refinement of the exemplary system, the plugin is registered with the second rendering tool is configured to support a dummy file format, such that the plugin is configured to embed the web server in the second rendering tool.

In another refinement of the exemplary system, the plugin comprises a write API configured to offer an HTTP server connection to the HTTP client of the first render engine.

In another refinement of the exemplary system, first rendering tool is configured to generate the output essence comprising the processed plurality of frames just in time in response to the request from the client device, without processing an entirety of the at least one input essence before generating the output essence.

In another refinement of the exemplary system, the first rendering tool is configured to generate the output essence from the at least one input essence before an entirety of the requested media content is written to a disk.

In another refinement of the exemplary system, the second rendering tool comprises a file format parser configured to load the at least one input essence from a file having the requested media content.

In another refinement of the exemplary system, the at least one instruction for processing comprises adding a logo to the at least one input essence to generate the output essence, such that the requested media content includes the logo when displayed by browser of the client device.

It is noted that the above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

FIG. 4 is a block diagram illustrating a computer system on which aspects of systems and methods for providing dynamic random access rendering in accordance with exemplary aspects of the present disclosure.

DETAILED DESCRIPTION

Figure 1:
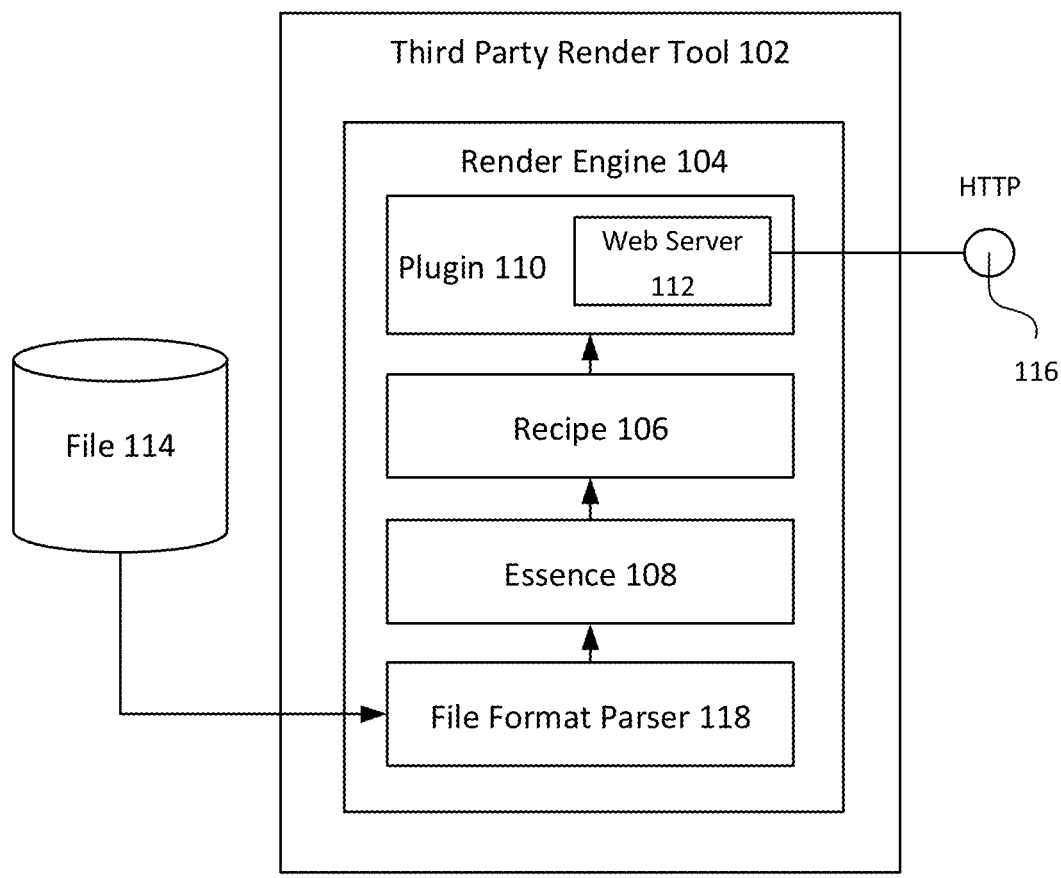
FIG. 1 is a block diagram of a system for providing dynamic random access rendering in accordance with exemplary aspects of the present disclosure.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

In general, many of the tools that can render recipes offer application programming interfaces (APIs) that allow for additional essence file formats to the supported. Code that exploits these APIs is packaged in a binary payload called a plugin. The plugins can either be format readers, which are configured to open a binary file and offer the corresponding essence to the tool, or format writers, which are configured to read an essence from the tool and storing it in a file (with the bytes in the file arranged to comply with a defined format).

The present disclosure, in an exemplary aspect, exploits the writer APIs. Many of these APIs allow plugin authors to ask for a particular frame range to be rendered by the tool. As a result, instead of invoking the tool to render all the frames for the duration of the recipe (e.g., a thirty minute program that may contain 45000 frames of video), a plugin author can ask for a subset of this range of frames. More particularly, this allows for individual frames to be requested in the exemplary aspect.

Because the plugin hosted by the tool is simply a binary piece of code, a network connection to other pieces of software from the plugin code can be included. As will be described in more detail below, an HTTP server is embedded in the rendering tool according to the exemplary aspect. This HTTP server can then be configured to offer the flows and grains protocol over HTTP. Grains are encapsulated essence chunks, i.e., the units of media essence, such as frames, GOPs (groups of pictures) of video, sample of audio, or the like. Flows are streams of grains that have the same type of payload. Flows map time (e.g., frame offsets) to bytes of a media file, and thus provide an index into the grains at a particular time.

In an exemplary aspect, when the HTTP server receives a request for a grain in a particular format at a particular time offset, the plugin can invoke the API of the rendering tool to request the range of frames required by the grain. The plugin can then use the result of the API call to format the grain and build an HTTP response.

FIG. 1 is a block diagram of system 100 for providing dynamic random access rendering in accordance with exemplary aspects of the present disclosure. As shown, the system 100 generally includes a third party render tool 102 comprising a render engine 104. The render engine 104 is configured to obtain and/or load recipe 106 to render an output essence (e.g., media content). The recipe 106 may reference one or more file(s) 114, which may correspond to an input linear video and/or audio essence (i.e., source essence or source content). Example formats of file 114 include MXF, MOV, MP3 MP4, WMV, or the like. In order to read file 114, render engine 104 can be configured to utilize a file format parser 118, which may be a plugin that is compatible with the file format of file 114. File format parser 118 parses file 114 to obtain and provide essence 108 for recipe 106, which is configured to reference this source essence to produce a new essence (e.g., the output essence). In this case, essence 108 is read-only input data (e.g., media content, such as video frames or audio data) that render engine 104 can process to create a new essence as output media content. In one exemplary aspect, recipe 106 further includes instructions on how to process input essences, such as essence 108, to generate the output essence. It should be noted that during the modification, file 114 is not modified.

Instead, during parsing, a new essence 108 is generated based on file 114. The new essence 108 is the file that is in fact modified.

In general, the processing instructions applied to process the input essence can be any type of video and/or audio editing functions for video playout. Exemplary aspects of the processing instructions format and ratio conversion, changing the color of a video source, combining two video sources using an alpha channel blend (e.g., using key and fill algorithms), resizing a video source, lowering the db level of an audio source, interleaving two mono audio sources to generate a stereo pair, or burning into video the results of decoding a captions stream. Thus, it should be appreciated that the processing instructions are not limited to a particular implementation given that the instructions perform some type of editing or modification processing on the input essence data.

System 100 also includes plugin 110 for the render engine 104. As mentioned previously, plugins of a rendering tool may be configured to read and/or write essence files in a particular file format originally unsupported by the rendering tool. Because rendering tools are conventionally compatible with such plugins, plugin 110 may be registered with rendering tool 102 as supporting a "dummy" file format such as a gves file. "Dummy" refers to the fact that no such file format in fact exists. Nonetheless, rendering tool 102 may recognize the dummy file format as a legitimate file format that the plugin 110 can read/write. Instead of plugin 110 performing these file read/writes, however, the code of plugin 110 can be exploited to embed web server 112 in rendering tool 102 and specifically in the plugin 110 itself. For example, plugin 110 may be deployed as a write API plugin that offers an HTTP server connection to external devices. Here, the code that runs the web server 112 runs inside plugin 110 and provides a connection for the plugin to access the media content.

Specifically, in system 100, recipe 106 is loaded by the third party render tool 102. In one aspect, the recipe 106 may be loaded when a user of the render tool 102 passes a recipe file path to the rendering tool 102, which can be Adobe Media Encoder, for example, using a user interface. Moreover, once the recipe 106 is loaded, a command for render engine 104 to render an essence 108 in the dummy file format invokes plugin 110. In the exemplary embodiment, web server 112 is hosted by (i.e., embedded in) plugin 110 as soon as plugin 110 is initialized by tool 102. Web server 112 may receive a connection from a third-party system that issues a client request for one or more frames of essence 108. Web server 112 uses the render API offered by the host system (e.g., rendering tool 102) to respond to the request over HTTP. That is, TCP port 116 is configured to be open to receive connections from other software (e.g., clients of web server 112) ready to negotiate the HTTP protocol. Clients such as the third-party system thus make requests using representational state transfer (REST) to ask for payloads that comprise the results of rendering. More specifically, when the connection is established, and the render API provides the requested one or more frames to plugin 110, plugin 110 then creates grain payloads to order comprising the one or more frames and returns the payload via web server 112 to the requesting third-party system. This configuration and workflow can be seen as "just-in-time," implying that only frames explicitly called for are rendered and each frame is made to order.

Figure 2:
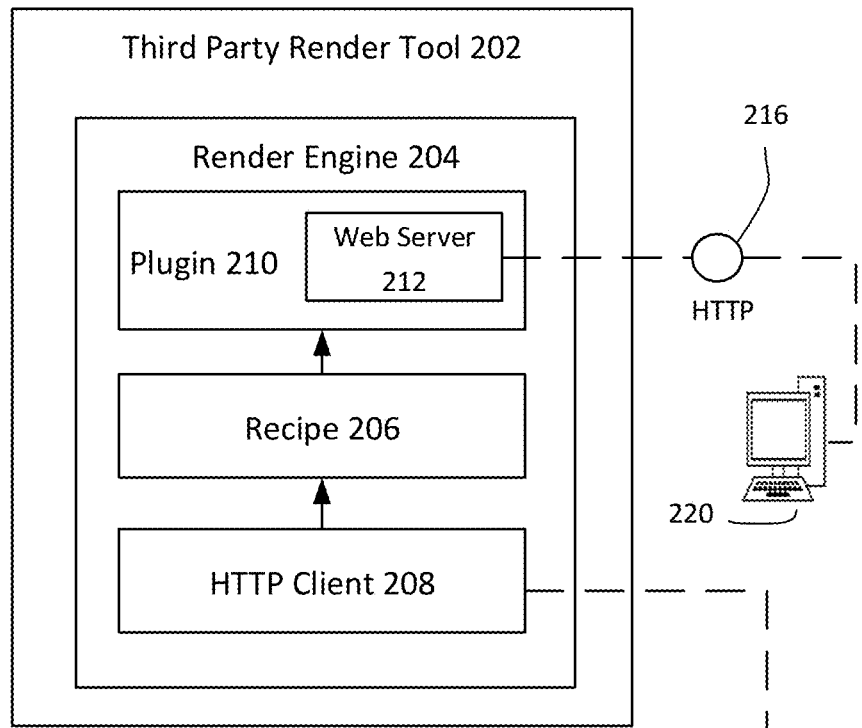
FIG. 2 is a block diagram of a system for providing dynamic random access rendering with a plurality of rendering tools in accordance with exemplary aspects of the present disclosure.
Figure 2:
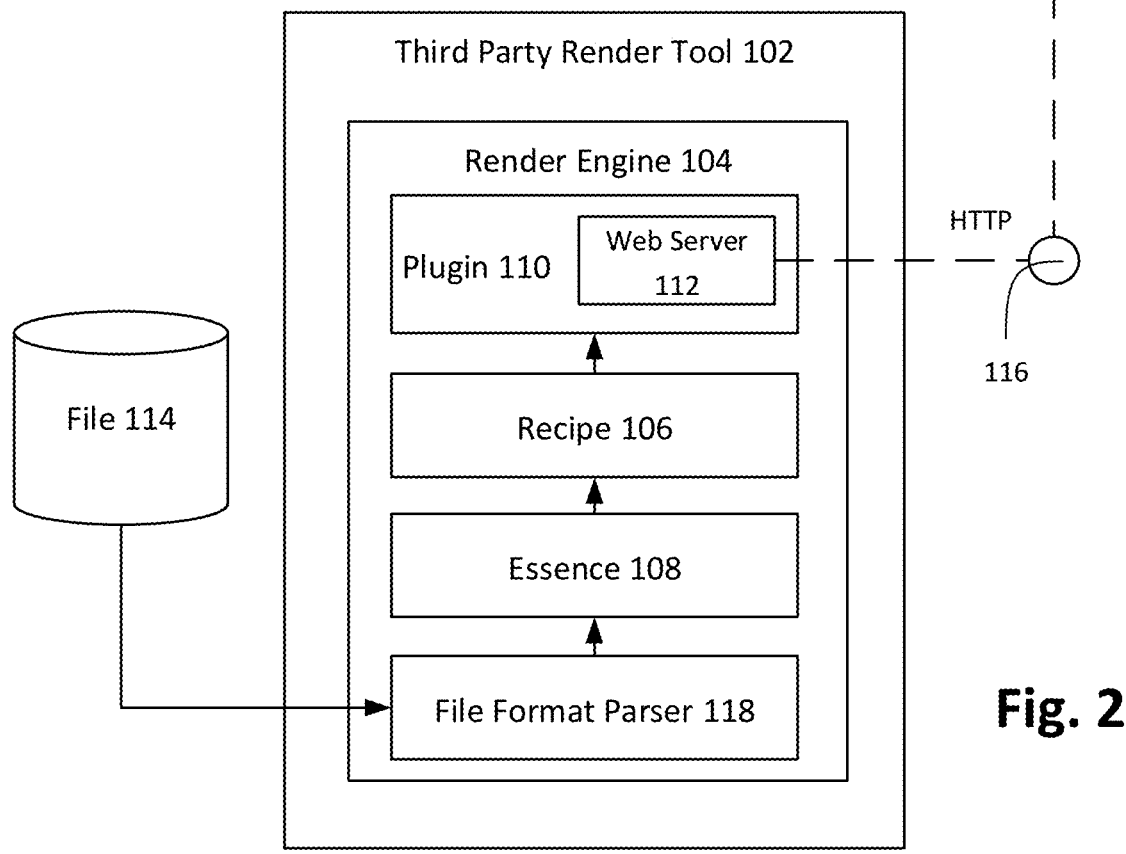

FIG. 2 is a block diagram of system 200 for providing dynamic random access rendering with a plurality of rendering tools in accordance with exemplary aspects of the present disclosure. It is noted that while FIG. 2 only illustrates two third party render tools 102 and 202 linked together, the system can be configured to link two more such third party render tools together as would be appreciated to one skilled in the art.

As shown, system 200 includes tool 102 of system 100, and also a second rendering tool, i.e., third party render tool 202. It should be appreciated that tool 202 structurally and functionally corresponds to render tool 102 and comprises render engine 204, recipe 206, HTTP client 208, and plugin 210, which comprises web server 212 embedded therein. Tool 202 may be the same type of rendering tool as tool 102 (e.g., both may be Adobe Premiere Pro or the like) or may be a completely different rendering tool (e.g., iMovie™), for example. It should be noted that although these examples of rendering tools comprise user interfaces, tools 102 and 202 may not necessarily have user interfaces. Instead, they may simply accept input essence(s), execute instructions (e.g., adjusting color, image quality, captions, etc.), and provide an output essence.

Rendering tool 202 may also be a rendering software that is constructed to request grains over HTTP. As shown, a client device 220 can be communicatively coupled to TCP port 216 to invoke the system 200. For example, a media content browser can be executed on client device 220 (e.g., in a browser for example) to request the rendered content using the exemplary algorithms described herein. In a first example, when rendering tool 202 is invoked by client device 220, recipe 206 has a reference to an essence 108 with a gves format (e.g., the dummy file format that the reader API plugin of tool 202 is registered to offer).

During rendering, when tool 202 requests a frame, HTTP client 208 is configured to establish a connection with web server 112, via TCP port 116, for example, that is embedded in plugin 110 and requests a grain over HTTP that will contain the frame in question from tool 102. This request is received by tool 102, via web server 112, and can be handled by the writer API plugin 110 configured in tool 102. The resulting payload from tool 102 satisfies the request, and tool 202 renders the resulting essence accordingly.

More specifically, plugin 210 may comprise a second write API plugin (referred to as write API plugin 210). In an example, recipe 106 in tool 102 is configured for creating a thirty minute magazine program and recipe 206 in tool 202 is configured for inserting a logo onto a set of frames of the magazine program. Recipe 206 may specifically require inserting the logo onto the set of frames representing the first 15 minutes of the magazine program. When tool 202 receives a grain request for the second 15 minutes of the magazine program with the inserted logo, writer API plugin 210 requests a frame offset requested by the grain request. For example, the magazine program may be a 60 frames per second video that contains 108,000 frames in total. The second half of the video represents 54,000 frames, making the frame offset equal to 54,000. The grain request received by write API plugin 210 may be received, via web server 212 and its TCP port 216, from a different rendering tool (not shown) or a web browser that will output the result. In this example, the result can be output by web server 212 to client device 220 to be displayed in the browser thereon.

Tool 202 accordingly requests a source frame from HTTP client 208, which itself makes an HTTP grain request of the upstream tool (i.e., tool 102) via web server 112. Web server 112 of the write API plugin 110 receives the request via TCP port 116, and requests render engine 104 for the correct frames for the grain (e.g., frames 54,001-108,000), awaits the response (i.e., the essence 108 from file 114 as described above), and returns the frames. This allows HTTP client 208 to provide the requested frames to render engine 204 that then inserts the logo into the requested frames using known techniques that would be appreciated by those skilled in the art.

As can be seen in this example, at no point do any of the rendering tools wait for a completed essence file to be written to a disk before rendering the resulting content to client device 220. In fact, a plurality of rendering tools can be chained together such that the essences used as inputs for the thirty minute magazine program also do not need to be written to a disk. For example, the thirty minute magazine program may comprise two halves of independent clips. The second clip may originate from a third rendering tool not depicted. With the methods discussed, the three rendering tools can be chained together so that tool 202 can request frames from tool 102, which can request frames from the third tool.

Figure 3:
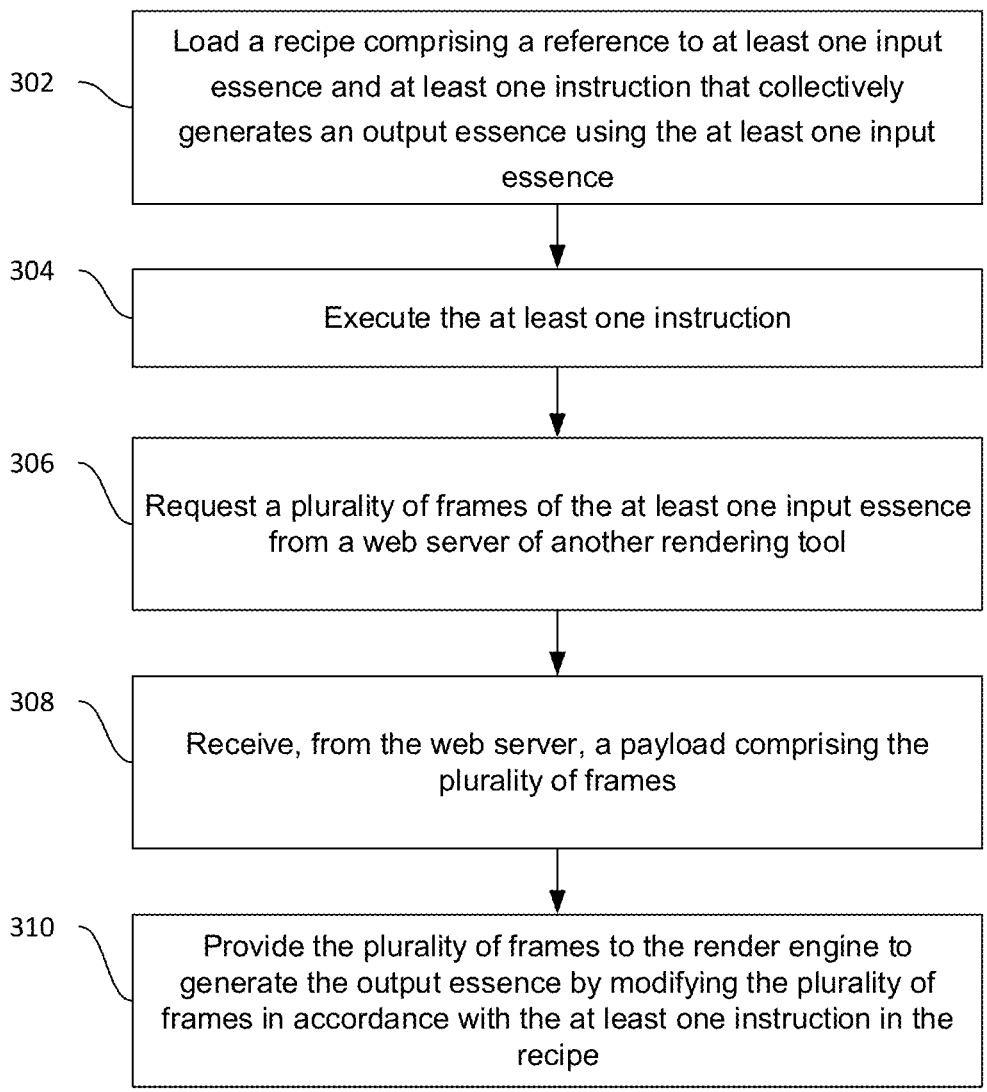
FIG. 3 is a flow diagram of a method for providing dynamic random access rendering in accordance with exemplary aspects of the present disclosure.

FIG. 3 is a flow diagram of method 300 for providing dynamic random access rendering in accordance with exemplary aspects of the present disclosure.

At 302, a rendering tool (e.g., tool 202) loads a recipe (e.g., recipe 206) comprising a reference to at least one input essence (e.g., essence 108) and at least one instruction that collectively generates an output essence using the at least one input essence. Referring to the overarching example of the present disclosure, the at least one input essence may be the thirty minute magazine program and the at least one instruction may be to increase the color saturation of the first minute of the essence by 50% (where only the first minute of the ½ hour magazine program is to be outputted). Only one instruction is presented for simplicity, but one skilled in the art would recognize that multiple complex instructions may be included in the recipe.

At 304, a render engine (e.g., render engine 204) of the rendering tool executes the instruction. In order to execute the instruction, the input essence file must first be read. Conventionally, the recipe would reference a file (e.g., file 114), but in this example, the at least one input essence file may only be accessible from another rendering tool (e.g., tool 102) that has to write the at least one input essence.

A plugin (e.g., plugin 110) of a render engine embeds a web server (e.g., web server 112) in the another rendering tool. At 306, the an HTTP client (e.g., client 208) of the rendering tool (e.g., tool 202) connects with the web server of the another rendering tool (e.g., tool 102) and requests a plurality of frames of the at least one input essence from the web server of the another rendering tool.

At 308, the HTTP client receives a payload comprising the plurality of frames from the web server. At 310, the HTTP client provides the plurality of frames to the render engine to generate an output essence by modifying the plurality of frames in accordance with the instruction in the recipe. For example, the render engine executes the instruction to adjust the color saturation of the first 3600 frames of the input essence and renders the output essence comprising these 3600 frames.

As seen once again, this method eliminates the need to fully render the at least one input essence using the another rendering tool. In the example, the final output is only 3600 frames out of the original 108,000 frames. Therefore fully rendering the input essence, in particular the unused frames, is unnecessary and wastes computing resources and time.

Another benefit of the systems and methods described is that any of the APIs offered by tool vendors can be reused to provide the HTTP connection. The systems and methods do not require that all rendering tools be of the same type or follow the same protocol. Files are an inefficient abstraction to build a workflow on. As discussed previously, files involve waiting for each rendering tool to write to a disk. Random access streams are a better alternative abstraction to build a workflow on top of because read and write APIs do not need written data files to access essences.

The systems and methods described in the present disclosure optimize render resource usage and prevent repeated compression steps (as each stage normally compresses each output as it writes to the essence files—adding picture quality loss to the pipeline). The systems and methods also stream render during live recordings without accruing compounding render delays and latency, and dynamically deploy extra resources to speed a render graph by allowing parallel instances of tools to be deployed (even running the same recipe).

It should also be noted that the HTTP flows and grains protocol is not limited to conventional rendering tools such as Adobe Premiere Pro. There are many applications that can be a client of the HTTP flows and grains protocol. For example, a web browser may ask for h.264 encoded grains for display. The result would be a render visualization tool that can view any un-rendered recipe to order.

FIG. 4 is a block diagram illustrating a computer system 20 on which aspects of systems and methods of dynamic random access rendering. It should be noted that the computer system 20 can correspond to any computing system configured to execute the render tool 102 and/or render tool 202 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to file store 130.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. It should be appreciated that in an exemplary aspect, the remote computer 49 can correspond to a content consuming device, such as a device configured to execute web browser 110 as described above.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 1, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for dynamic access rendering of media content, the system comprising:
   a client device configured to request media content that is configured by a recipe and to display output essence on a browser executed on the client device;
   a first rendering tool configured to load the recipe in response to a request from the client device, with the recipe comprising a reference to at least one input essence and at least one instruction that is a video editing function for modifying the at least one input essence to generate the output essence;
   a render engine of the first rendering tool configured to execute the at least one instruction;
   an HTTP client of the first render engine configured to:
      receive, from the client device, a particular frame range of the at least one input essence, with the particular frame range being a subset of an entire frame range of the at least one input essence and the subset being continuous frames of the media content in the particular frame range;
      request, from an embedded web server hosted by a plugin of a second rendering tool, the particular frame range of the at least one input essence;
      receive, from the embedded web server, a payload comprising the continuous frames of media content in the particular frame range of the at least one input essence; and
      provide continuous frames of media content to the render engine of the first rendering tool,
   wherein the render engine of the first rendering tool is further configured to generate a modified version of the particular frame range by dynamically executing the at least one instruction in the recipe to modify the continuous frames of media content on a frame by frame basis to render the output essence in the browser executed on the client device.

2. The system according to claim 1, wherein the plugin registered with the second rendering tool is configured to support a dummy file format, such that the plugin is configured to embed the web server in the second rendering tool.

3. The system according to claim 1, wherein the plugin comprises a write API configured to offer an HTTP server connection to the HTTP client of the first render engine.

4. The system according to claim 1, wherein the first rendering tool is configured to generate the output essence comprising the modified particular frame range just in time in response to the request from the client device, without processing the entire frame range of the at least one input essence before generating the output essence.

5. The system according to claim 1, wherein the first rendering tool is configured to generate the output essence from the at least one input essence before the entire frame range of the requested media content is written to a disk.

6. The system according to claim 1, wherein the second rendering tool comprises a file format parser configured to load the at least one input essence from a file having the requested media content.

7. The system according to claim 1, wherein the video editing function of the at least one instruction for processing comprises adding a logo to the particular frame range of the at least one input essence to generate the output essence, such that the requested media content includes the logo when displayed by browser of the client device.

8. A system for dynamic access rendering of media content, the system comprising:
   a first rendering tool configured to load a recipe in response to a request from a client device, with the recipe comprising a reference to at least one input essence and at least one instruction for processing the at least one input essence to generate the output essence;
   a render engine of the first rendering tool configured to execute the at least one instruction;
   an HTTP client of the first render engine configured to:
      receive, from the client device, a particular frame range of the at least one input essence, with the particular frame range being a subset of an entire frame range of the at least one input essence and the subset being continuous frames of the media content in the particular frame range;
      request, from an embedded web server hosted by a plugin of a second rendering tool, the particular frame range of the at least one input essence;
      receive, from the embedded web server, a payload comprising the continuous frames of media content in the particular frame range of the at least one input essence; and
      provide continuous frames of media content to the render engine of the first rendering tool,
   wherein the render engine of the first rendering tool is further configured to generate a modified version of the particular frame range by dynamically executing the at least one instruction in the recipe to process the continuous frames of media content on a frame by frame basis to render the output essence on a browser of the client device.

9. The system according to claim 8, wherein the plugin registered with the second rendering tool is configured to support a dummy file format, such that the plugin is configured to embed the web server in the second rendering tool.

10. The system according to claim 8, wherein the plugin comprises a write API configured to offer an HTTP server connection to the HTTP client of the first render engine.

11. The system according to claim 8, wherein the first rendering tool is configured to generate the output essence comprising the processed particular frame range just in time in response to the request from the client device, without processing the entire frame range of the at least one input essence before generating the output essence.

12. The system according to claim 8, wherein the first rendering tool is configured to generate the output essence from the at least one input essence before the entire frame range of the requested media content is written to a disk.

13. The system according to claim 8, wherein the second rendering tool comprises a file format parser configured to load the at least one input essence from a file having the requested media content.

14. The system according to claim 8, wherein the at least one instruction for processing comprises adding a logo to the at least one input essence to generate the output essence, such that the requested media content includes the logo when displayed by browser of the client device.

15. A system for dynamic random access rendering of media content, the system comprising:
 a rendering tool configured to load a recipe comprising a reference to at least one input essence and at least one instruction that is a video editing function that modifies an output essence using the at least one input essence;
 a render engine of the rendering tool configured to execute the video editing function of the at least one instruction and including a file format parser configured to load a received frame range of continuous frames of the at least one input essence from a file of the media content, and further including a plugin having a web server embedded therein that is communicatively coupled with a TCP port for receiving a request from a client device for the output essence,
 wherein the render engine is configured to generate the output essence from the received frame range of the at least one input essence in accordance with the video editing function of the at least one instruction in the recipe to generate a modified version of the received frame range by dynamically executing the at least one instruction in the recipe to modify the continuous frames of the media content on a frame by frame basis to render the output essence in a browser executed on the client device.

16. The system according to claim 15, further comprising the client device that is configured to request the media content configured by the recipe and to receive the modified version of the received frame range as the generated output essence to be displayed on the browser executed thereon.

17. The system according to claim 15, wherein the rendering tool is further configured to generate the modified version of the received frame range as the output essence just in time in response to the request from the client device, without processing an entirety of the at least one input essence before generating the output essence.

18. The system according to claim 15, wherein the rendering tool is configured to generate the modified version of the received frame range as the output essence from the at least one input essence before an entirety of the requested media content is written to a disk.

19. The system according to claim 15, wherein the video editing function of the at least one instruction is configured for processing the received frame range of the at least one input essence by adding a logo to the at least one input essence to generate the output essence, such that the modified version of the received frame range for the requested media content includes the logo when displayed by browser of the client device.

* * * * *

UNITED STATES PATENT AND TRADEMARK OFFICE
CERTIFICATE OF CORRECTION

PATENT NO. : 11,810,599 B2
APPLICATION NO. : 17/225987
DATED : November 7, 2023
INVENTOR(S) : James Westland Cain It is certified that error appears in the above-identified patent and that said Letters Patent is hereby corrected as shown below:

On the Title Page

Item (71) Applicant: please delete "Newbury" and substitute therefor -- Newbury Berkshire --; and Item (72) Inventor: please delete "Newbury" and substitute therefor -- Newbury Berkshire --.

Signed and Sealed this
Fifth Day of December, 2023

Katherine Kelly Vidal
*Director of the United States Patent and Trademark Office*